Dec. 13, 1955  F. J. WINCHELL  2,726,906
BEARING CONSTRUCTION
Filed Feb. 2, 1953  2 Sheets-Sheet 1
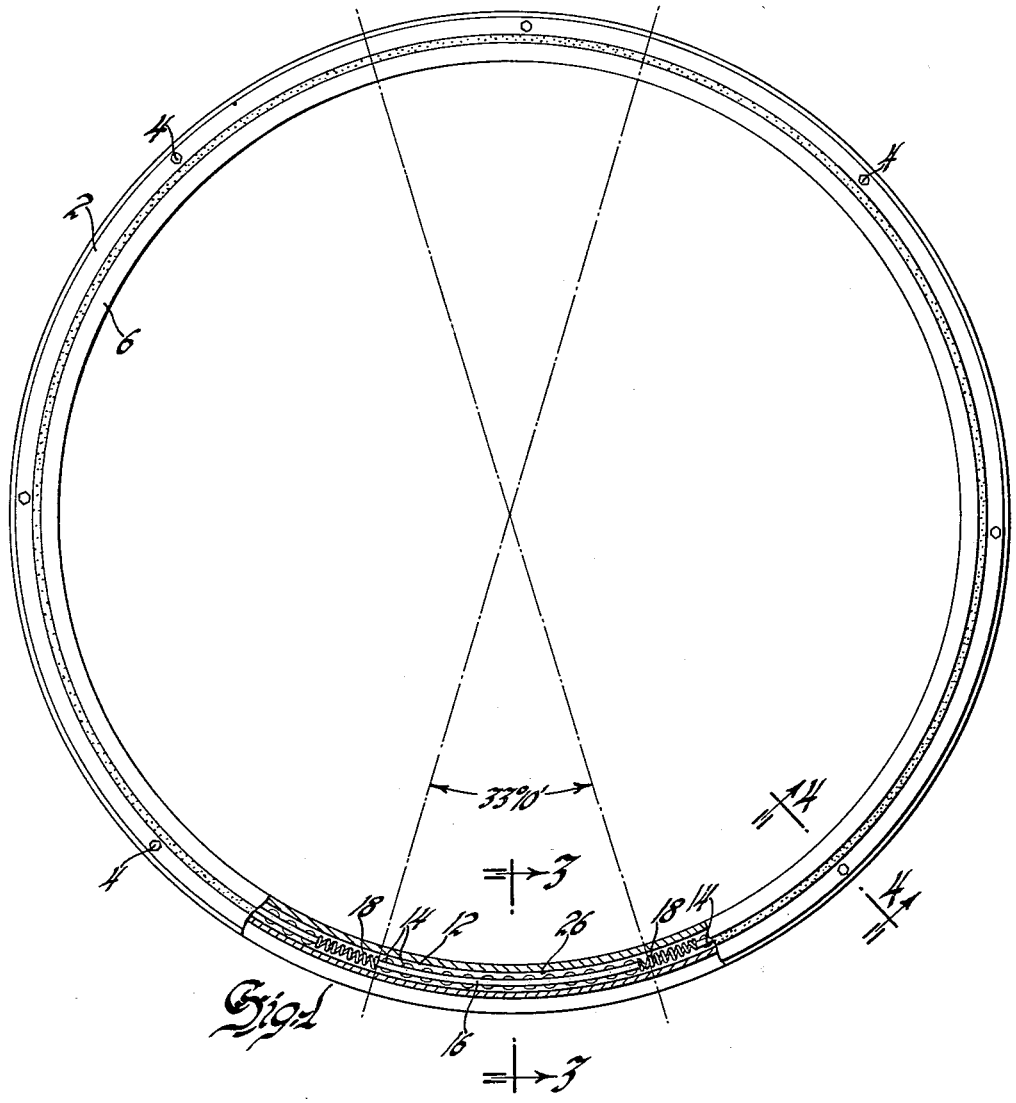
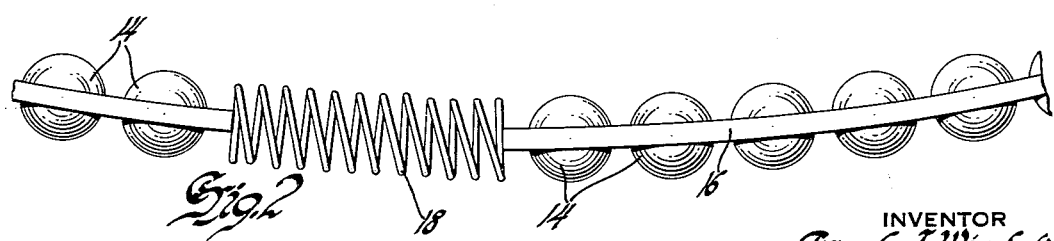
INVENTOR
Frank J. Winchell
BY
Willits, Helwig & Bailie
ATTORNEYS Dec. 13, 1955  F. J. WINCHELL  2,726,906
BEARING CONSTRUCTION
Filed Feb. 2, 1953  2 Sheets-Sheet 2

INVENTOR
Frank J. Winchell
BY
Willis, Helwig & Baillio
ATTORNEYS

United States Patent Office 2,726,906
Patented Dec. 13, 1955

2,726,906

BEARING CONSTRUCTION

Frank J. Winchell, Franklin Village, Mich., assignor to General Motors Corporation, Detroit, Mich., a corporation of Delaware Application February 2, 1953, Serial No. 334,401

3 Claims. (Cl. 308—201)

This invention relates to large diameter ring bearings and more particularly to means for reducing friction induced in such bearings by variations in loading of the races.

In the past it has been customary to mount heavy gun turrets and the like on large diameter race ring bearings, to facilitate rapid and smooth angular movement. Such bearings usually comprise a fixed outer race member and an inner race member mounted for concentric rotation therein. The race members are provided with mating circumferential grooves forming an annular circumferential circuit in which are disposed a plurality of antifriction ball bearings. Customarily the balls are disposed in groups carried by segmental arcuate retainers which maintain each of the balls in the group in predetermined spaced relation. The number of arcuate retainers employed usually substantially fill the annular circumferential circuit, and effectively prevent rubbing contact between the balls during rotation of the inner race. However, it has been found that, under certain conditions of operation, friction tends to build up to an undesirable degree due to variations in the loading of the races causing a variation in the rate of progression of the individual segmental retainer assemblies. Therefore, the more rapidly progressing assemblies may overtake the slower moving assemblies and induce crowding or cramping, which forces some of the balls to slide rather than rotate. Since this sliding action greatly increases frictional resistance to rotation, it is desirable that means be provided to eliminate such crowding. It is well known in the prior art to reduce the number of retainer assemblies and interpose helical springs between the remaining assemblies to permit, within limits, variation in the rate of progression. However, in mechanisms inquiring relatively great angular movement or continuous rotation of the inner race, it is apparent that the variations in rates of progression will quickly exhaust the resilient compensating effect of the springs and the aforementioned crowding will resume, thereafter greatly increase frictional drag.

An object of the invention is to provide a race ring bearing which is especially adapted for rapid and easy rotation of heavy mechanisms through relatively large angular distances.

Another object is to provide a turret race ring bearing of the type described having means for eliminating ball crowding under all conditions of bearing load.

Another object of this invention is to provide a turret race ring bearing of the type described having load relieving means which compensate for unequal rates of progression of the ball, irrespective of the degree of angular movement of the turret.

These and other objects and advantages of the invention will become more fully apparent as reference is had to the accompanying drawings wherein:

Figure 1 is a plan view, partly in section, of a large diameter race ring bearing showing the relative positions of the inner and outer races and the ball retainer assemblies.

Figure 2 is an enlarged fragmentary view showing a portion of the ball retainer assemblies and compensating springs.

Figure 3:
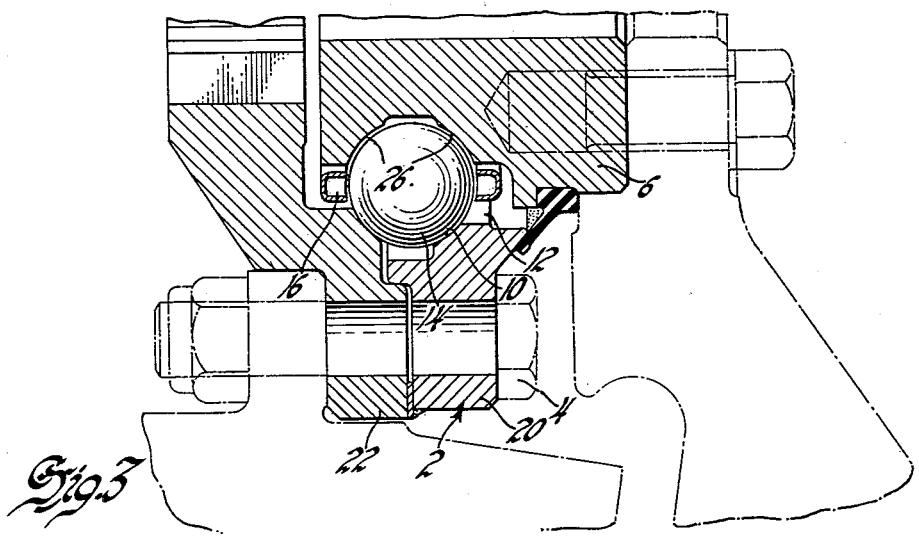
Figure 3 is a sectional elevational view of the ring assembly taken substantially along the line 3—3 of Figure 1, showing the relieved portion in the inner race.
Figure 4:
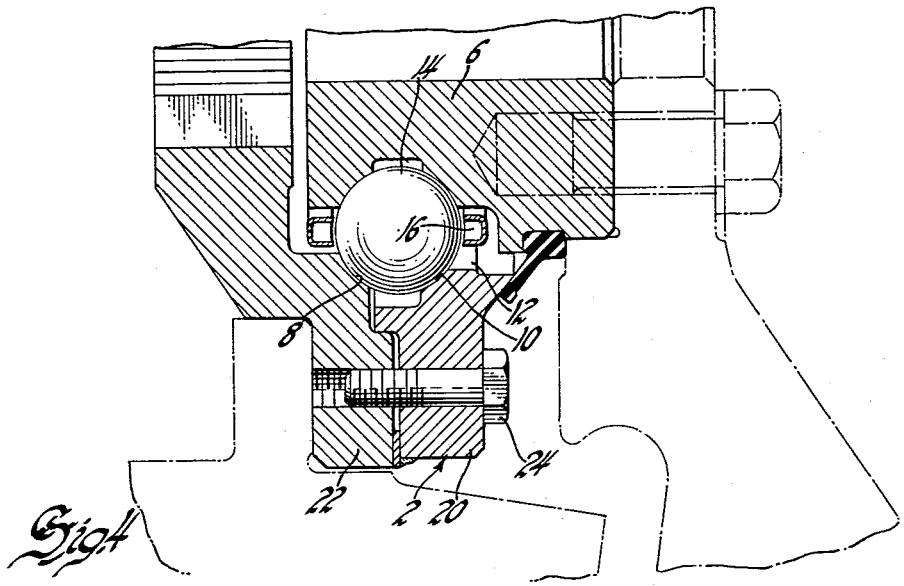
Figure 4 is a view similar to Figure 3 taken substantially along the line 4—4 of Figure 1, showing the normal surface contact between the inner race and the balls.

Referring now to the drawings and particularly Figure 1 there is shown a turret race ring bearing wherein the numeral 2 designates an outer race which is bolted to the hull of a tank or like vehicle, not shown, by a plurality of bolts 4. An inner race 6, which normally supports a gun turret, not shown, is mounted for concentric rotatable movement about the inner periphery of the outer race 2. To reduce friction and assure maximum ease of movement, inner and outer races 2 and 6 are provided with generally semi-circular mating grooves 8 and 10 which form an annular circuit 12 in which a plurality of ball bearings 14 are disposed. The ball bearings 14 are maintained in the spaced apart relation by segmental angularly spaced ball retainers 16 which are separated by coil springs 18. In order to accomplish assembly of the balls and retainer assemblies in the annular circuit 12, the outer race 2 is constructed in two parts comprising an upper outer race member 20 and a lower outer race member 22. It will be apparent that the individual segmental retainers 16 and the balls 14 carried thereby must be inserted in the circumferential cavity 12 before the upper outer race member 20 is drawn into engagement with the lower outer race 22 by the bolts 24.

Normally the grooves 8 and 10 forming circumferential cavity 12 are ground to precise tolerance throughout their circumference to assure uniform rolling contact with each of the balls 14. In the present invention the circumferential cavity 12 defined by the inner and outer races is provided wtih two segmental diametrically opposed relieved portions 26 which extend through arcs of 33° and 10' of the complete circle, as indicated in Figure 1. In one form of the invention, as shown in the present embodiment, relieving is accomplished by grinding segmental arcs in inner race 6 to an effective diameter of six thousandths of an inch less than the inside diameter of the remainder of the inner race. A cross sectional view of relieved portion 26 is shown in exaggerated form in Figure 3. As seen in Figure 1 the 33° and 10' arcs provide a relieved area slightly longer than the segmental ball retainer assembly 16. It will be apparent that any compression built up in the spring 12 by rotation of the turret will be relieved when the individual retainer moves into the relieved area.

In order to more fully understand the operation of the relieving action, assume that the turret is being operated and that one of the retainer assemblies 16 is progressing more rapidly than the retainer assembly immediately preceding it. It will be apparent that under these circumstances the spring 12 in front of the more rapidly progressing retainer will compress until such time as the turret has been rotated sufficiently to bring the more slowly progressing retainer into the relieved arcuate portion 26. At this point the turret load on the more slowly progressing retainer will be relieved, permitting the previously compressed spring 12 to expand back to its normal length and reposition the relieved retainer to its original spacing. It will be seen, therefore, that the springs 12 function to compensate for variation in rates of progression of the individual retainer assemblies while the relieved portions permit periodic recentering of the retainers for repetition of the compensation action of the springs.

In a given size or type of installation, static load, conditions of unbalance and other factors may cause widely varying relative rates of progression of the retainer assemblies. However, the maximum variation may be determined experimentally and springs be provided of sufficient length to absorb the variations built up between each unloading zone.

It is further pointed out that the invention is not necessarily restricted to the form shown in the drawings. Diametrically opposed relieved areas of six thousandths of an inch extending through arcs of 33° and 10' are shown by way of example only. The relieved areas need not necessarily be opposed or restricted as to number or length. Similarly the depth of the relieved areas may vary according to individual requirements. Further, the relieved areas may be formed on either the outer or inner race.

From the foregoing it will be seen that a greatly improved bearing has been provided which effectively eliminates ball cramping. The invention may be adapted to conventional bearing construction at very low cost and permits much wider application of such bearing than has been heretofore possible.

While but a single embodiment has been shown and described it will be apparent that other changes and modifications may be made therein. It is therefore to be understood that it is not intended to limit the invention to the embodiment shown but only by the scope of the claims which follow.

I claim:

1. A bearing comprising an inner and an outer race, said races being provided with opposed circumferential grooves of substantially semi-circular cross section, a plurality of load bearing balls, spaced apart arcuate segments having spaced perforations retaining said balls in circumferentially spaced groups between said opposed grooves, compression spring means disposed between adjacent segments to permit limited unequal angular movement of said segments, and relieving means permitting said spring means to periodically expand and reposition said segments, said relieving means comprising diametrically opposite arcuately relieved portions formed in one of said circumferential grooves.

2. A bearing as claimed in claim 1 wherein said diametrically opposite arcuately relieved portions subtend arcs of thirty-three degrees and ten minutes.

3. A bearing structure as set forth in claim 1 wherein said inner race is formed of two separable sections whereby to permit assembly and disassembly of said structure.

References Cited in the file of this patent

UNITED STATES PATENTS

| | | |
|---|---|---|
| 774,893 | Riebe | Nov. 15, 1904 |
| 2,391,245 | Kail | Dec. 18, 1945 |

FOREIGN PATENTS

| | | |
|---|---|---|
| 848,108 | France | Oct. 24, 1939 |